(12) United States Patent
Islam et al.

(10) Patent No.: US 7,710,931 B2
(45) Date of Patent: May 4, 2010

(54) SYSTEM AND METHOD FOR HANDLING SIMPLE IP TO MOBILE IP TRANSITION

(75) Inventors: M. Khaledul Islam, Kanata (CA); Hao Xue, Ottawa (CA); Jin Kim, Ottawa (CA)

(73) Assignee: Research in Motion Limited, Waterloo, Ontario (CA)

( * ) Notice: Subject to any disclaimer, the term of this patent is extended or adjusted under 35 U.S.C. 154(b) by 1618 days.

(21) Appl. No.: 10/929,405

(22) Filed: Aug. 31, 2004

(65) Prior Publication Data
US 2006/0045080 A1    Mar. 2, 2006

(51) Int. Cl.
H04W 4/00    (2009.01)
(52) U.S. Cl. .................. 370/338; 370/328; 455/439
(58) Field of Classification Search .............. None
See application file for complete search history.

(56) References Cited

U.S. PATENT DOCUMENTS

| | | | |
|---|---|---|---|
| 6,230,012 B1 | 5/2001 | Willkie et al. | |
| 6,766,168 B1 * | 7/2004 | Lim | 455/435.1 |
| 2001/0049285 A1 * | 12/2001 | Park et al. | 455/432 |
| 2002/0181498 A1 | 12/2002 | Hsu et al. | |
| 2002/0198708 A1 * | 12/2002 | Zak et al. | 704/233 |
| 2004/0087304 A1 | 5/2004 | Buddhikot et al. | |
| 2004/0214574 A1 * | 10/2004 | Eyuboglu et al. | 455/439 |
| 2005/0025132 A1 * | 2/2005 | Harper et al. | 370/352 |
| 2005/0073969 A1 * | 4/2005 | Hart et al. | 370/318 |
| 2005/0169249 A1 * | 8/2005 | Shirota et al. | 370/352 |
| 2006/0019708 A1 * | 1/2006 | Raman et al. | 455/561 |

FOREIGN PATENT DOCUMENTS

WO    WO 2004006539 A1    1/2004

OTHER PUBLICATIONS

Sung Kim: "SK Telecom's IP Packet Core Network Overview: Its past, present and future" SK TELECOME, 2001, pp. 1-45, XP002341643 *pp. 4, 10, 12-21.
Spirent Communications: "CDMA Applications Performance Test Platform APEX C2K" Spirent, May 2004) pp. 1-4, XP002341644 *p. 3, paragraph 2.
Kelkar R. et al: "Mobile IP in 3G CDMA networks" Personal Wireless Communications, 2002 IEEE International Conference on Dec. 15-17, 2002, Piscaraway, NJ, USA, IEEE, Dec. 15, 2002, pp. 41-44, XP010630748 ISBN: 0-7803-7569-6 pp. 41-42 p. 43, right-hand column.
Database WPI Section EI, Week 200416 Derwent Publications Ltd., London, GB; AN 2002-605894 XP002341694 & KR 399 576 B (Korea Electronics & Telecom Res Inst) Sep. 26, 2003 *abstract*.

* cited by examiner

*Primary Examiner*—Jayanti K Patel
*Assistant Examiner*—Anthony Sol (57) ABSTRACT

Methods are provided for transitioning between SIP and MIP. Mobile devices, upon detecting a new system, automatically attempt a MIP session to avoid the default position of SIP. A history is maintained of systems visited, and for systems that did not support MIP in the past, a MIP session is not attempted, but rather SIP is initiated from the start.

25 Claims, 5 Drawing Sheets

| SYSTEM NUMBER | NETWORK IDENTIFYING PARAMETERS | | | ACCESS ATTRIBUTE 106 | ATTRIBUTE TIMER 108 |
|---|---|---|---|---|---|
| | SYSTEM ID (SID) 100 | NETWORK ID (NID) 102 | PACKET ZONE ID 104 | | |
| 1 | S1 | N1 | P1 | MIP NOT GRANTED | T1 |
| 2 | S2 | N2 | P2 | MIP GRANTED | NA |
| ⋮ | ⋮ | ⋮ | ⋮ | ⋮ | ⋮ |
| k | Sk | Nk | Pk | MIP NOT SUPPORTED | Tk |
| L | SL | NL | PL | MIP NOT GRANTED | TL |

SYSTEM AND METHOD FOR HANDLING SIMPLE IP TO MOBILE IP TRANSITION

FIELD OF THE APPLICATION

The application relates to the provision of IP (Internet Protocol) connectivity to wireless devices, and in particular to transitions between simple IP and mobile IP sessions.

BACKGROUND

There are two IP modes supported in a cdma2000® wireless IP network. These are the so-called simple IP (SIP) and mobile IP (MIP). Details of CDMA wireless IP are provided in TIA IS-835. The standard is known in Third Generation Partnership Project 2 (3GPP2) as X.S0011. The mobile IP section of the IS-835 standard refers in turn to the Internet Engineering Task Force (IETF) standard named RFC2002. Some cdma2000-based wireless IP networks support both MIP and SIP. Others support only SIP or only MIP. Regardless of the operation mode, the network and the mobile device establish and configure the point-to-point protocol (PPP) as described in RFC1661 to establish a packet data session. An "always-on" mobile device always maintains PPP connectivity even when it does not have radio link layer connectivity to the network. When the device or network does not have any data to send, the packet data service on the mobile device enters a "dormant" state. The PPP connectivity between the network and the device is maintained, but the physical radio connection is torn down in such a state. Note that cdma2000® is a registered trademark of the Telecommunications Industry Association (TIA-USA).

In a SIP-based wireless IP network, mobile devices are assigned geographically dependent IP addresses dynamically by the visited Packet Data Serving Nodes (PDSN). As the mobile device moves it will be assigned a new geographically dependent IP address. If the mobile device supports any "push" applications such as Push e-mail, then it is the responsibility of the mobile device to notify the associated push servers whenever its IP address as assigned by the wireless network changes. In a SIP-based network, mobile devices may not know how long the IP address is assigned for. The PDSN may tear down the PPP session and reassign the IP address to another mobile device if it has not heard from the mobile device upon the expiration of an assigned IP address duration. A PDSN may unilaterally tear down the PPP session if the mobile fails to respond to page messages while out of coverage even if the PPP session time has not expired. This will break push services as the mobile device is no longer associated with the IP address that the push servers are aware of. As a result, "Always-on" mobile devices in a SIP session need to send periodic "keep alive" packets to maintain PPP connectivity.

In a mobile IP network, each mobile device is typically assigned a static IP address by its home agent (HA) which is then maintained by the mobile terminal regardless of its geographical point of attachment. As the mobile moves, it registers with a foreign agent (FA) which provides a care-of-address (COA). The home agent is informed of the mobile device's COA through the registration procedure. The foreign agent maintains a binding of Home IP address to care-of-address. The home agent receives packets for the terminal and forwards these to the foreign agent according to the care-of-address such that the mobile device remains reachable via its geographically-independent IP address. Because of this, a MIP terminal will always be reachable. The network notifies the mobile of the duration of the address and as such the mobile terminal will know the expiry time of assigned address. As long as the mobile device re-registers before this timer expires, the PPP connectivity is maintained.

Mobile IP provides a number of other advantages over simple IP such as multiple user profiles with different user ID/password etc. This allows a single mobile device to have multiple user accounts. The IS-835 standard only states that if a wireless terminal fails to establish a mobile IP session, it should fall back to SIP mode to establish a SIP data session. The standard does not state any mechanism how a "dormant" mobile device in a SIP session can establish a MIP session when it visits a network that supports MIP.

Figure 1:
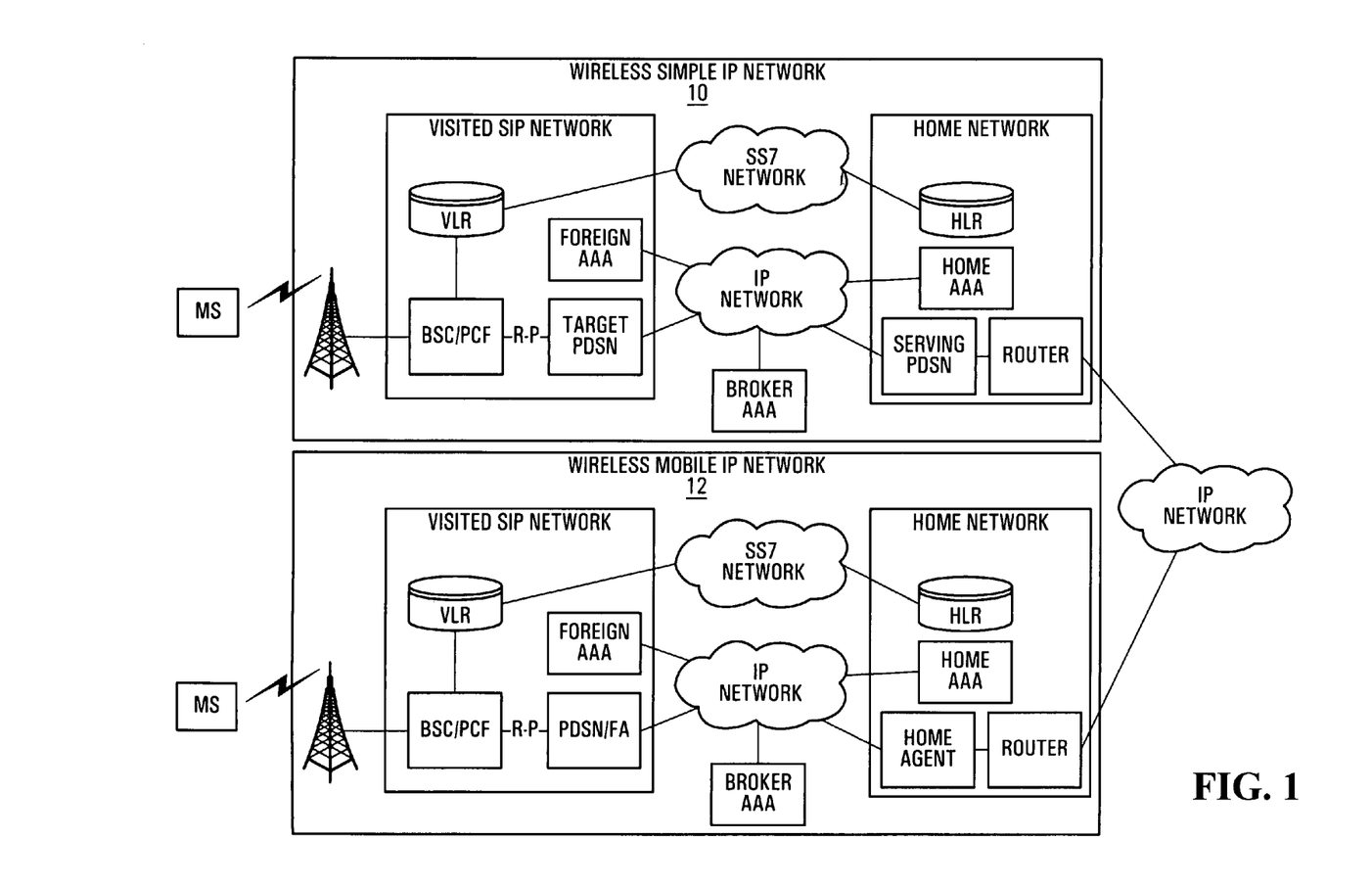
FIG. 1 is a block diagram of an example wireless IP network.

For the purpose of illustration, shown in FIG. 1 is an example of a cdma2000 wireless IP network as described in IS-835. There is a wireless simple IP network 10 and a wireless mobile IP network 12.

SUMMARY

According to one broad aspect, the application provides a method for transitioning between a first wireless protocol having geographically dependent addressing and a second wireless protocol having non-geographically dependent addressing, the method comprising: a wireless device detecting a new system requiring reconnect of a packet data service while in a state during which link layer connectivity for a packet data service is maintained; and at least a first time the wireless device detects the new system, the wireless device attempting to establish a session using the second wireless protocol with the new system; wherein the first wireless protocol comprises SIP (simple IP) and the second wireless protocol comprises MIP (mobile IP).

In some embodiments, the method is executed only if the mobile device is in state during which link layer connectivity for a packet data service is maintained and a radio link has been torn down.

In some embodiments, the method further comprises: the wireless device storing MIP support information for each new system detected, the MIP support information indicating whether or not a MIP session was established; upon the wireless device detecting a new system requiring reconnect of a packet data service: a) the wireless device checking to see if MIP support information was previously stored in respect of the new system; b) if there is MIP support information indicating a MIP session was established during a previous visit to the new system, the wireless device attempting to establish a MIP session with the new system; and c) if there is MIP support information indicating a MIP session was not established during a previous visit to the new system, the wireless device attempting to establish a SIP session with the new system.

In some embodiments, the method further comprises, if there is no MIP support information stored for the new system: initiating a SIP reconnect request to establish a SIP session; transmitting an unsolicited agent solicitation; if a MIP agent advertisement is received in response to the unsolicited agent solicitation, terminating the SIP session and initiating a MIP session; and adding a record in respect of the new system to indicate whether or not a MIP session was established.

In some embodiments, the method further comprises: transmitting the unsolicited agent solicitation message on a traffic channel assigned as a result of the SIP reconnection.

In some embodiments, the method further comprises: initiating a new call to set up a traffic channel, and transmitting the unsolicited agent solicitation message on the traffic channel.

In some embodiments, the method further comprises: waiting until a new call is initiated that results in a new traffic channel being set up, and transmitting the unsolicited agent solicitation message on the traffic channel.

In some embodiments, the method further comprises: if IPCP is not configured as MIP upon initiating the MIP session, falling back to SIP mode and making the MIP support information indicate that MIP was not supported, and falling back to SIP mode; and if IPCP is configured as MIP upon initiating the MIP session, and MIP registration is not successful, making the MIP support information indicate that MIP was not granted, and falling back to SIP mode.

In some embodiments, the method further comprises: detecting a new system by detecting a change in one or more network identifying parameters.

In some embodiments, the method further comprises: putting a time limit on the validity of the MIP support information for each system stored by the wireless device.

According to another broad aspect, the application provides a wireless device adapted to communicate with access networks using a first wireless protocol having geographically dependent addressing and a second wireless protocol having non-geographically dependent addressing, the wireless device being adapted to detect a new system requiring reconnect of a packet data service while in a state during which link layer connectivity for a packet data service is maintained, and at least a first time the wireless device detects the new system, to attempt to establish a session using the second wireless protocol with the new system; wherein the first wireless protocol comprises SIP (simple IP) and the second wireless protocol comprises MIP (mobile IP).

In some embodiments, the wireless device is adapted to attempt to establish the MIP session only if the mobile device is in state during which link layer connectivity for a packet data service is maintained and a radio link has been torn down.

In some embodiments, the wireless device comprises: a memory for storing MIP support information for each new system detected, the MIP support information indicating whether or not a MIP session was established; wherein: upon the wireless device detecting a new system requiring reconnect of a packet data service, the wireless device checks to see if MIP support information was previously stored in respect of the new system; if there is MIP support information indicating a MIP session was established during a previous visit to the new system, the wireless device attempts to establish a MIP session with the new system; if there is MIP support information indicating a MIP session was not established during a previous visit to the new system, the wireless device attempts to establish a SIP session with the new system.

In some embodiments, if there is no MIP support information for the new system the wireless device is adapted to: initiate a SIP reconnect request to establish a SIP session and to transmit an unsolicited agent solicitation; if a MIP agent advertisement is received in response to the unsolicited agent solicitation, terminate the SIP session and initiating a MIP session; and add a record in respect of the new system to indicate whether or not a MIP session was established.

In some embodiments, the wireless device is further adapted to transmit the unsolicited agent solicitation message on a traffic channel assigned as a result of the SIP reconnection.

In some embodiments, the wireless device is further adapted to initiate a new call to set up a traffic channel, and to transmit the unsolicited agent solicitation message on the traffic channel.

In some embodiments, the wireless device is further adapted to wait until a new call is initiated that results in a new traffic channel being set up, and to transmit the unsolicited agent solicitation message on the traffic channel.

According to another broad aspect, the invention provides a computer readable medium having computer executable instructions stored thereon for execution on a wireless device so as to implement a method of transitioning between a first wireless protocol having geographically dependent addressing and a second wireless protocol having non-geographically dependent addressing, the method comprising: a wireless device detecting a new system requiring reconnect of a packet data service while in a state during which link layer connectivity for a packet data service is maintained; and at least a first time the wireless device detects the new system, the wireless device attempting to establish a session using the second wireless protocol with the new system; wherein the first wireless protocol comprises SIP (simple IP) and the second wireless protocol comprises MIP (mobile IP).

In some embodiments, the method of the computer readable medium further comprises: the wireless device storing MIP support information for each new system detected, the MIP support information indicating whether or not a MIP session was established; upon the wireless device detecting a new system requiring reconnect of a packet data service: a) the wireless device checking to see if MIP support information was previously stored in respect of the new system; b) if there is MIP support information indicating a MIP session was established during a previous visit to the new system, the wireless device attempting to establish a MIP session with the new system; and c) if there is MIP support information indicating a MIP session was not established during a previous visit to the new system, the wireless device attempting to establish a SIP session with the new system.

In some embodiments, the method of the computer readable medium further comprises if there is no MIP support information stored for the new system: initiating a SIP reconnect request to establish a SIP session; transmitting an unsolicited agent solicitation; if a MIP agent advertisement is received in response to the unsolicited agent solicitation, terminating the SIP session and initiating a MIP session; and adding a record in respect of the new system to indicate whether or not a MIP session was established.

In some embodiments, the method of the computer readable medium further comprises: transmitting the unsolicited agent solicitation message on a traffic channel assigned as a result of the SIP reconnection.

In some embodiments, the method of the computer readable medium further comprises: initiating a new call to set up a traffic channel, and transmitting the unsolicited agent solicitation message on the traffic channel.

Further embodiments provide computer readable media for executing any of the above described methods.

BRIEF DESCRIPTION OF THE DRAWINGS

Preferred embodiments will now be described with reference to the attached drawings in which.

DETAILED DESCRIPTION OF THE PREFERRED EMBODIMENTS

The TIA/EIA IS-835 standard does not specify how or whether a mobile station with a SIP session should check for availability of a MIP network. An example of the necessity for such a feature would be the case when a MIP-capable mobile device with a dormant packet data service (e.g. an always-on mobile device) comes back to its home MIP network after it was forced to establish a SIP session on a roaming SIP network. Attempting to establish a MIP session for every data call initiation is not applicable to an "always-on" device which maintains data connectivity all the time. As a result, an "always-on" wireless terminal may get stuck in SIP mode until a power cycle (when the radio on the device is powered off and turned back on).

With MIP, there is a foreign agent in the network being visited by a wireless terminal and a home agent on the wireless terminal's home network. The home agent receives packets for the terminal and forwards these to the foreign agent. The foreign agent checks the home address to COA mapping, and forwards the packets to the wireless terminal upon receipt.

Typically, on a visited network, a PDSN will send a list of different available COAs together with an indication that it is available to function as a foreign agent. This is a so-called "agent advertisement" message. This message is sent after the PPP between the device and the network is set up. The wireless terminal then initiates the MIP registration process by sending a Registration Request message to the foreign agent which includes a selected COA, a home agent address, home IP address and some parameters required for authentication. Once the mobile device is authenticated, the foreign agent sends the MIP Registration Request to the home agent. The home agent responds with a Registration Response message that includes a registration life time and other parameters such as home IP address (if it has not been assigned already). Then, the home and foreign agents establish a tunnel so that the mobile device can be reached by its home IP address.

As per cdma2000 packet data standard (TIA IS-707), a dormant wireless terminal with a PPP (point-to-point protocol) connection is required to "re-connect" its packet data service whenever it detects a change in network parameters such as system ID (SID), network ID (NID) or packet zone ID. In accordance with an embodiment of the application, a MIP-capable mobile device attempts to discover whether a new network to which it is trying to reconnect its dormant packet data session supports MIP or not. It may send an ICMP (Internet Control Message Protocol) Agent solicitation message as part of the re-connect process which does not require any extra data call set-up. In response to this, if the network supports mobile IP, then the network sends an ICMP agent advertisement message even if the wireless terminal is currently in SIP mode. Note the ICMP protocol is common to both SIP and MIP stacks.

In accordance with one embodiment, each wireless terminal maintains a visited network list (VNL) to keep track of some number of visited networks in terms of whether or not MIP was supported and granted during the last visit. The agent solicitation trigger may be partially based on the existing information in the VNL. Advantageously, this may reduce blind attempts to establish MIP sessions where they are not possible. Preferably, the VNL is updated every time the wireless terminal decides to solicit agent advertisement.

Figure 2A:
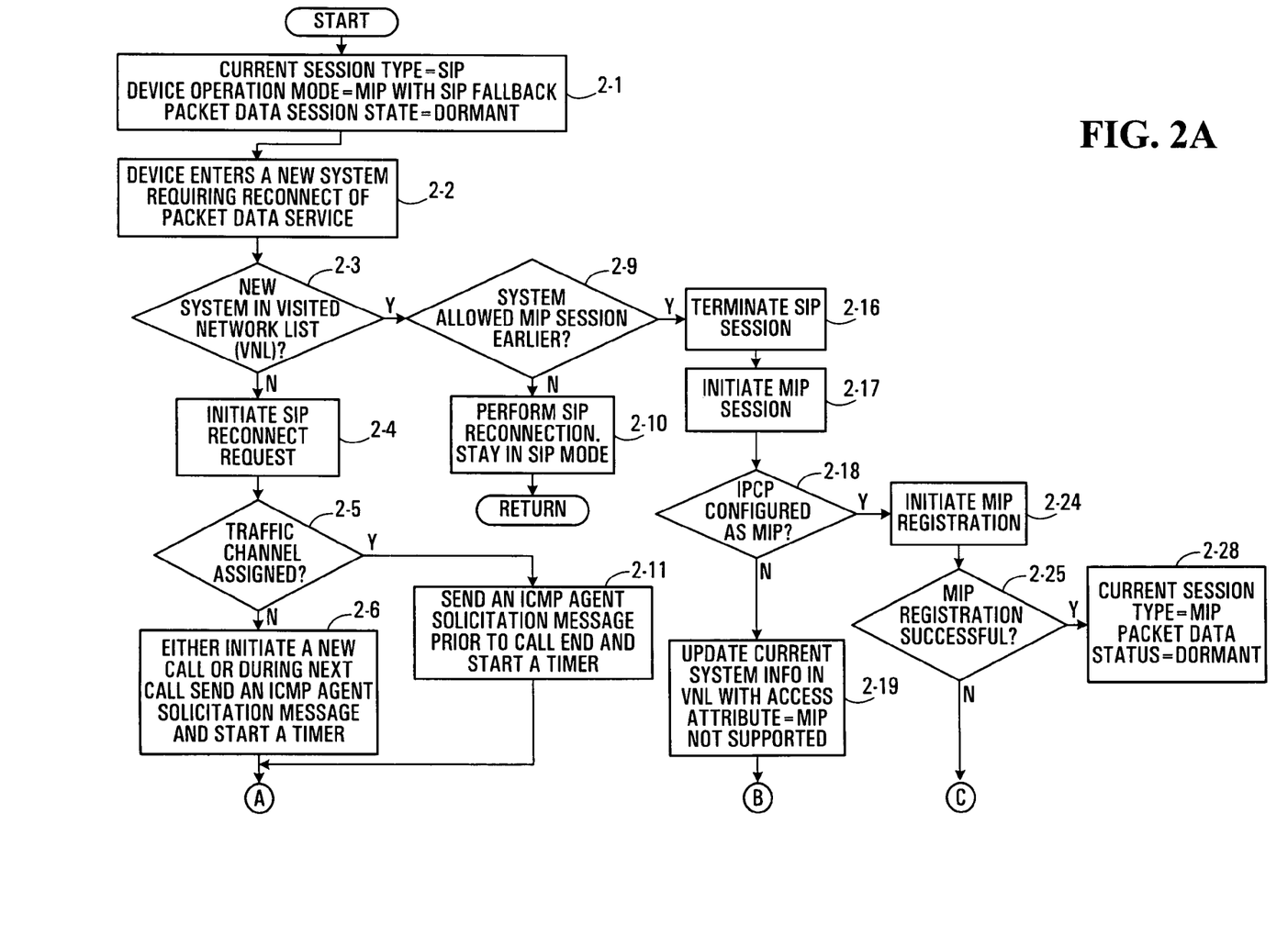
FIG. 2 is a flowchart of a method of handling simple IP to mobile IP transitions in accordance with one embodiment.
Figure 2B:
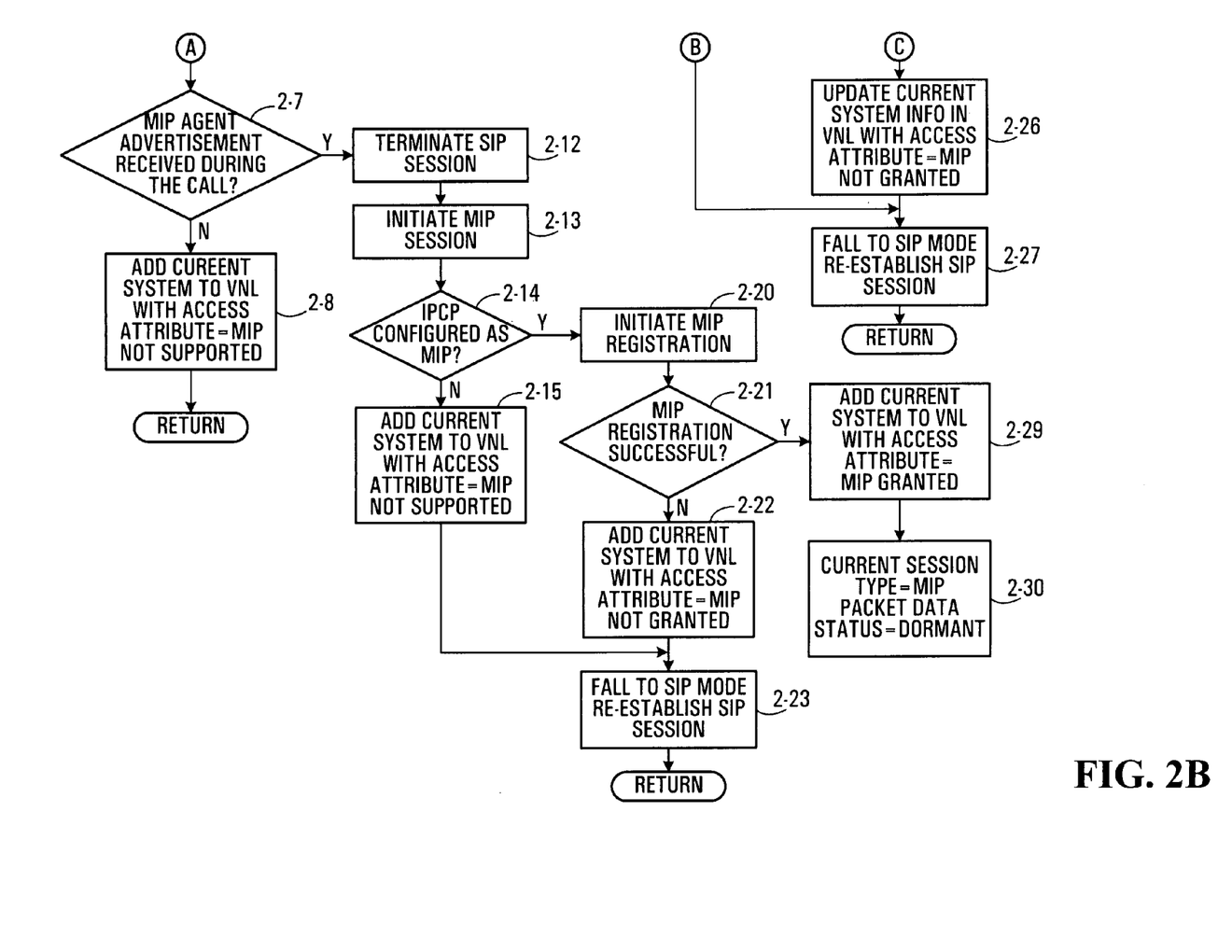

Referring now to FIG. 2, shown is a detailed flowchart of a method of handling simple IP to mobile IP transitions in accordance with an embodiment of the application. The method begins at step 2-1 with the session type being SIP and the device operational mode being MIP with SIP fall back. The packet data session state is dormant. At step 2-2, the mobile terminal detects that it has entered a new system requiring re-connect of the packet data service. This is detected by determining that there has been a change in one or more of the system parameters such as the system ID, network ID or packet zone ID to name a few examples.

At step 2-3, the mobile terminal examines its VNL to determine if the new system is in the list. If it is not in the list (no path step 2-3) then at step 2-4 a SIP re-connect request is initiated. If a traffic channel is assigned (yes path step 2-5) then the mobile terminal sends an ICMP agent solicitation message prior to call end and starts a timer. If no traffic channel has been assigned (no path step 2-5) then at step 2-6 the mobile terminal either initiates a new call, or during the next call sends an ICMP agent solicitation message and starts a timer. Then, after either step 2-11 or 2-6, if at step 2-7 an agent advertisement was not received during the call then MIP mode is not available, and the current system is added to the VNL with the access type "MIP not supported" at step 2-8. Note a "call" refers to any origination, for example a voice call. "Connection" on the other hand refers to PPP connectivity or the like.

On the other hand, if a MIP advertisement was received during the call (yes path step 2-7) then the SIP session is terminated at step 2-12. A MIP session set-up is initiated at step 2-13. If the Internet Protocol Control Protocol (IPCP) is configured as MIP as described in IS-835 (yes path step 2-14), then MIP registration is initiated at step 2-20. If MIP registration was successful (yes path step 2-21) then the current system is added to the VNL with the access attribute indicating "MIP granted" at step 2-29. At this point, the current session type is MIP and the packet data status is dormant as indicated at step 2-30. On the other hand, if the IPCP was not configured as MIP (no path step 2-14) then the current system is added to the VNL with an access attribute indicating "MIP not supported". At this point the terminal falls back to SIP mode and attempts to re-establish a SIP session at step 2-23. Similarly, if MIP registration was not successful (no path step 2-21) then the current system is also added to the VNL with the access attribute "MIP not granted" at step 2-22 and the mobile terminal falls back into SIP mode and re-establishes a SIP session at step 2-23. The distinction between step 2-15 and step 2-22 is that in step 2-15 MIP was not supported whereas in step 2-22 MIP was supported but MIP was not granted for the particular access attempt.

Returning now to step 2-3, if the new system is included in the VNL (yes path) then the VNL can be used to determine whether the system allowed a MIP session earlier. If the system did not allow a MIP session earlier (no path step 2-9) then packet data service re-connection is performed at step 2-10 and the mobile terminal stays in SIP mode. On the other hand, if the VNL indicates that the system did allow MIP session earlier (yes path step 2-9) then at step 2-16 the mobile terminates the SIP session. The mobile terminal initiates a MIP session set-up at step 2-17. If the IPCP is configured successfully as MIP as described IS-835 (yes path step 2-18) then the mobile terminal attempts to initiate MIP registration at step 2-24. If MIP registration was successful (yes path step 2-25) then the current session type is MIP and the packet data status is dormant as indicated at step 2-28. On the other hand, if MIP registration was unsuccessful (no path step 2-25) then the mobile terminal updates the system information and the VNL to indicate that the access attribute is "MIP not granted" at step 2-26. Also, if the IPCP is not configured as MIP (no path step 2-18), then the system information is updated in the VNL with the access attribute "MIP not supported". After either of steps 2-19 or 2-26 the mobile terminal falls back to SIP mode and attempts to re-establish a SIP session at step 2-27.

Figure 3:
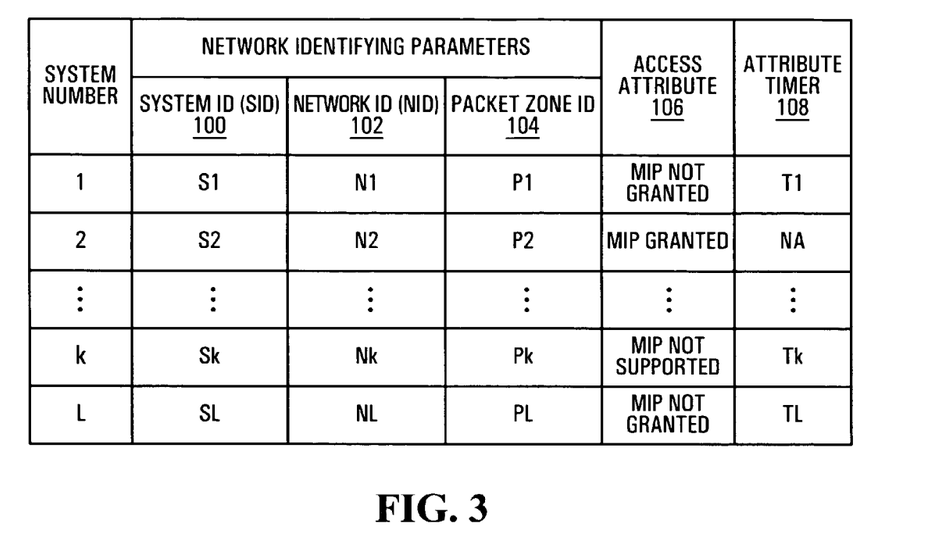
FIG. 3 is an example of a visited network list for use with the embodiment of FIG. 2.

FIG. 3 shows an example of the above discussed VNL. The VNL has a number of rows for various systems. Each network has a number of network identifying parameters. In the illustrated example these include system ID 100, network ID 102 and packet zone ID 104. However, it may be that in other implementations a subset of these three parameters or different network identifying parameters may be used. Whenever there is a change in any of the three parameters, the mobile terminal can make the determination that it may be possible to transition from SIP to MIP. The access attribute for the network identified by the network identifying parameters is listed in column 106. The three possible access attributes in the embodiment described above are "MIP not granted", "MIP granted", and "MIP not supported". In the illustrated example there are L systems, and the attribute "MIP not granted" is indicated for System No. 1, the attribute "MIP granted" is indicated for System No. 2 and System No. L, and the attribute "MIP not supported" is indicated for System No. k. Also shown in column 108 is a field for a so-called "attribute timer". In the illustrated example, System Nos. 1, k and L all have timers T1, Tk and TL respectively. These timers are used to indicate how long the access attribute is to be considered valid. Once the attribute timer expires for a given system, it becomes as if the system is not included in the VNL. It is not necessary to run a timer for the systems having a "MIP granted" access attribute.

The timer can be implemented in any suitable manner, the only important feature being that after some time, the mobile will again consider re-attempting MIP even though previously it had failed to establish MIP in a given network.

The VNL is preferably maintained in the mobile terminal in memory. While it may be desirable that the memory be non-volatile memory, this is not essential since if the mobile terminal undergoes a power cycle it will attempt to establish an initial connection in MIP mode and will build up the VNL from scratch again. Similarly, if the wireless component of PDA-type mobile device is turned off, VNL may be erased. Furthermore, while the VNL shown is used in some embodiments, more generally MIP support information is stored in any suitable fashion indicating for each system at least whether or not a MIP session was successfully established or not. In the above example, "MIP not granted" and "MIP not supported" both indicate a failure to establish a MIP session.

In another embodiment, no MIP support information is maintained in any form, and the wireless device attempts MIP every time a new system is detected.

Figure 4:
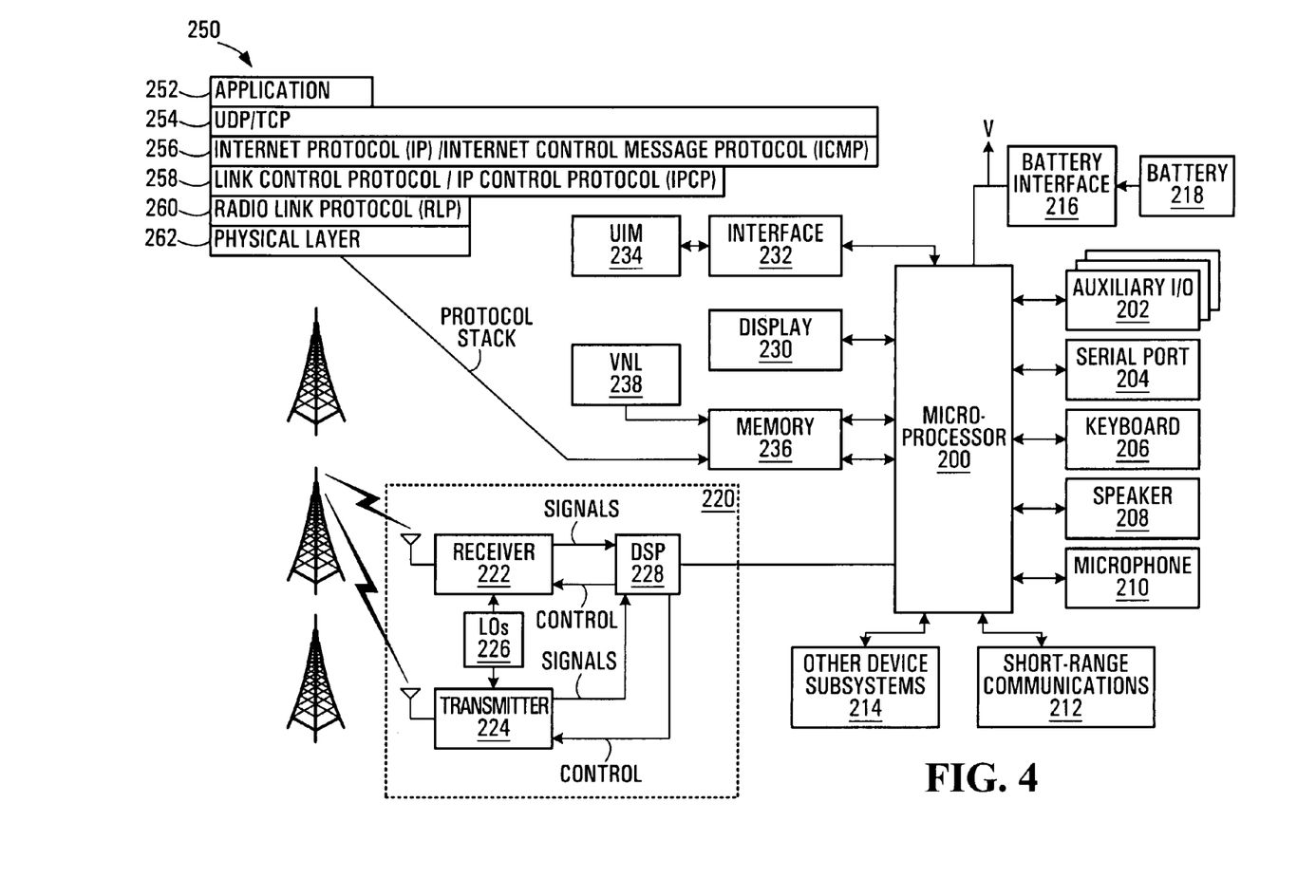
FIG. 4 is an example block diagram of a mobile device.

Referring to FIG. 4, shown is an example block diagram of a wireless terminal that may be adapted to implement the method of FIGS. 2 and 3. This is a very specific layout for a wireless terminal and it is to be understood that the application is not limited to this particular device. The device has a microprocessor 200 to which is connected auxiliary I/O 202, serial port 204, keyboard 206, speaker 208 and microphone 210. Short range communications functions are indicated at 212 and other device subsystems at 214. A battery interface is indicated at 216 and the battery itself at 218. The microprocessor 200 is connected to transceiver 220 which has a receiver 222 and transmitter 224 driven by local oscillators 226. A DSP 228 is shown in communication with both the receiver 222 and the transmitter 224. Also shown is a display 230 and an interface 232 to a User Identity Module (UIM) 234. Finally, shown is a memory 236 within which is stored the VNL 238 which might take the form of the VNL shown in FIG. 3 by way of example.

The functionality of the mobile device for communications purposes can be broken down using the OSI protocol stack. This is indicated generally at 250 which shows the application layer 252 on top below which is located the UDP/TCP layer 254, the Internet protocol/ICMP protocol 256, the link control protocol/IP control protocol (IPCP) 258, the radio link protocol (RLP) 260 and finally the physical layer 262. Preferably, the functionality which decides whether or not to attempt to set up a MIP session versus a SIP session, as described above with reference to FIGS. 2 and 3, is implemented as part of the network determination component of physical layer software running on the mobile terminal. However, it is to be understood that more generally the functionality could be implemented in any appropriate manner on a wireless terminal and not limited to the physical layer 262.

The embodiments described above have focussed on transitioning between SIP and MIP. More generally, other embodiments are applicable for transitioning between a first wireless protocol having geographically dependent addressing and a second wireless protocol having non-geographically dependent addressing while in a state during which link layer connectivity (e.g. PPP) is maintained for a packet data service but a radio link has been torn down, the Dormant state being an example of this. In some embodiments, the first and second wireless protocols are IP protocols. Particular examples of these IP protocols are SIP and MIP respectively. For some IP implementations, the link layer connectivity may be PPP or PPP-like connectivity. Other implementations may feature different link layer functionality.

In yet another embodiment, the method is applicable when the wireless device is involved in active communications for the packet data service, i.e. the device is not dormant, so the link layer connectivity is present, and the radio link is not torn down. For example, a handoff may occur from a network allowing only SIP to a network allowing MIP, and the method can be employed to detect the MIP capability and to re-establish the session as a MIP session.

Another embodiment provides a computer readable medium having computer executable instruction stored thereon for instructing a wireless device to implement any of the methods described herein.

Numerous modifications and variations of the present application are possible in light of the above teachings. It is therefore to be understood that within the scope of the appended claims, the application may be practised otherwise than as specifically described herein.

We claim:

1. A method for transitioning between a first wireless protocol having geographically dependent addressing and a second wireless protocol having non-geographically dependent addressing, the method comprising:

a wireless device detecting a new system requiring reconnect of a packet data service while in a state during which link layer connectivity for a packet data service is maintained;

the wireless device determining whether the new system has been previously visited by the wireless device;

if the wireless device has not previously visited the new system, the wireless device attempting to establish a session using the second wireless protocol with the new system; and if the wireless device has previously visited the new system:

a) the wireless device determining whether the new system previously allowed a session using the second wireless protocol; and
b) if the new system previously allowed a session using the second wireless protocol, the wireless device attempting to establish a session using the second wireless protocol with the new system;
wherein the first wireless protocol comprises SIP (simple IP) and the second wireless protocol comprises MIP (mobile IP).

2. A method according to claim 1 executed only if the mobile device is in state during which link layer connectivity for a packet data service is maintained and a radio link has been torn down.

3. A method according to claim 1, comprising:
the wireless device storing MIP support information for each new system detected, the MIP support information indicating whether or not a MIP session was established;
upon the wireless device detecting a new system requiring reconnect of a packet data service:
a) the wireless device checking to see if MIP support information was previously stored in respect of the new system;
b) if there is MIP support information indicating a MIP session was established during a previous visit to the new system, the wireless device attempting to establish a MIP session with the new system; and
c) if there is MIP support information indicating a MIP session was not established during a previous visit to the new system, the wireless device attempting to establish a SIP session with the new system.

4. A method of claim 3 further comprising, if there is no MIP support information stored for the new system:
initiating a SIP reconnect request to establish a SIP session;
transmitting an unsolicited agent solicitation;
if a MIP agent advertisement is received in response to the unsolicited agent solicitation, terminating the SIP session and initiating a MIP session; and
adding a record in respect of the new system to indicate whether or not a MIP session was established.

5. A method according to claim 4 further comprising:
transmitting the unsolicited agent solicitation message on a traffic channel assigned as a result of the SIP reconnection.

6. A method according to claim 4 further comprising:
initiating a new call to set up a traffic channel, and transmitting the unsolicited agent solicitation message on the traffic channel.

7. A method according to claim 4 further comprising:
waiting until a new call is initiated that results in a new traffic channel being set up, and transmitting the unsolicited agent solicitation message on the traffic channel.

8. A method according to claim 4 further comprising:
if IPCP is not configured as MIP upon initiating the MIP session, falling back to SIP mode and making the MIP support information indicate that MIP was not supported, and falling back to SIP mode; and
if IPCP is configured as MIP upon initiating the MIP session, and MIP registration is not successful, making the MIP support information indicate that MIP was not granted, and falling back to SIP mode.

9. A method according to claim 3 further comprising:
putting a time limit on the validity of the MIP support information for each system stored by the wireless device.

10. A method according to claim 1 further comprising:
detecting a new system by detecting a change in one or more network identifying parameters.

11. The method of claim 1 further comprising:
if the session using the second wireless protocol is established, the wireless device terminating use of the first wireless protocol thereby transitioning to the second wireless protocol.

12. A wireless device configured to communicate with access networks using a first wireless protocol having geographically dependent addressing and a second wireless protocol having non-geographically dependent addressing, the wireless device being configured to:
detect a new system requiring reconnect of a packet data service while in a state during which link layer connectivity for a packet data service is maintained;
determine whether the new system has been previously visited by the wireless device;
if the wireless device has not previously visited the new system, attempt to establish a session using the second wireless protocol with the new system; and
if the wireless device has previously visited the new system:
a) determine whether the new system previously allowed a session using the second wireless protocol; and
b) if the new system previously allowed a session using the second wireless protocol, attempt to establish a session using the second wireless protocol with the new system;
wherein the first wireless protocol comprises SIP (simple IP) and the second wireless protocol comprises MIP (mobile IP).

13. A wireless device according to claim 12 configured to attempt to establish the MIP session only if the mobile device is in state during which link layer connectivity for a packet data service is maintained and a radio link has been torn down.

14. The wireless device of claim 12 comprising:
a memory for storing MIP support information for each new system detected, the MIP support information indicating whether or not a MIP session was established;
wherein:
upon the wireless device detecting a new system requiring reconnect of a packet data service, the wireless device checks to see if MIP support information was previously stored in respect of the new system;
if there is MIP support information indicating a MIP session was established during a previous visit to the new system, the wireless device attempts to establish a MIP session with the new system;
if there is MIP support information indicating a MIP session was not established during a previous visit to the new system, the wireless device attempts to establish a SIP session with the new system.

15. The wireless device of claim 14 wherein if there is no MIP support information for the new system the wireless device is configured to:
initiate a SIP reconnect request to establish a SIP session and to transmit an unsolicited agent solicitation;
if a MIP agent advertisement is received in response to the unsolicited agent solicitation, terminate the SIP session and initiating a MIP session; and
add a record in respect of the new system to indicate whether or not a MIP session was established.

16. The wireless device of claim 15 further configured to initiate a new call to set up a traffic channel, and to transmit the unsolicited agent solicitation message on the traffic channel.

17. The wireless device of claim 15 further configured to wait until a new call is initiated that results in a new traffic channel being set up, and to transmit the unsolicited agent solicitation message on the traffic channel.

18. The wireless device of claim 15 further configured to transmit the unsolicited agent solicitation message on a traffic channel assigned as a result of the SIP reconnection.

19. The wireless device of claim 12 further configured to:
if the session using the second wireless protocol is established, terminate use of the first wireless protocol thereby transitioning to the second wireless protocol.

20. A computer readable medium having computer executable instructions stored thereon for execution on a wireless device so as to implement a method of transitioning between a first wireless protocol having geographically dependent addressing and a second wireless protocol having non-geographically dependent addressing, the method comprising:
a wireless device detecting a new system requiring reconnect of a packet data service while in a state during which link layer connectivity for a packet data service is maintained;
the wireless device determining whether the new system has been previously visited by the wireless device;
if the wireless device has not previously visited the new system, the wireless device attempting to establish a session using the second wireless protocol with the new system; and
if the wireless device has previously visited the new system:
a) the wireless device determining whether the new system previously allowed a session using the second wireless protocol; and
b) if the new system previously allowed a session using the second wireless protocol, the wireless device attempting to establish a session using the second wireless protocol with the new system;
wherein the first wireless protocol comprises SIP (simple IP) and the second wireless protocol comprises MIP (mobile IP).

21. The computer readable medium of claim 20 wherein the method comprises:
the wireless device storing MIP support information for each new system detected, the MIP support information indicating whether or not a MIP session was established;
upon the wireless device detecting a new system requiring reconnect of a packet data service:
a) the wireless device checking to see if MIP support information was previously stored in respect of the new system;
b) if there is MIP support information indicating a MIP session was established during a previous visit to the new system, the wireless device attempting to establish a MIP session with the new system; and
c) if there is MIP support information indicating a MIP session was not established during a previous visit to the new system, the wireless device attempting to establish a SIP session with the new system.

22. The computer readable medium of claim 20, the method further comprising if there is no MIP support information stored for the new system:
initiating a SIP reconnect request to establish a SIP session;
transmitting an unsolicited agent solicitation;
if a MIP agent advertisement is received in response to the unsolicited agent solicitation, terminating the SIP session and initiating a MIP session; and
adding a record in respect of the new system to indicate whether or not a MIP session was established.

23. The computer readable medium of claim 22 wherein the method further comprises:
transmitting the unsolicited agent solicitation message on a traffic channel assigned as a result of the SIP reconnection.

24. The computer readable medium of claim 22 wherein the method further comprises:
initiating a new call to set up a traffic channel, and transmitting the unsolicited agent solicitation message on the traffic channel.

25. The computer readable medium of claim 20 wherein the method further comprises:
if the session using the second wireless protocol is established, the wireless device terminating use of the first wireless protocol thereby transitioning to the second wireless protocol.

* * * * *